Patented Oct. 22, 1929

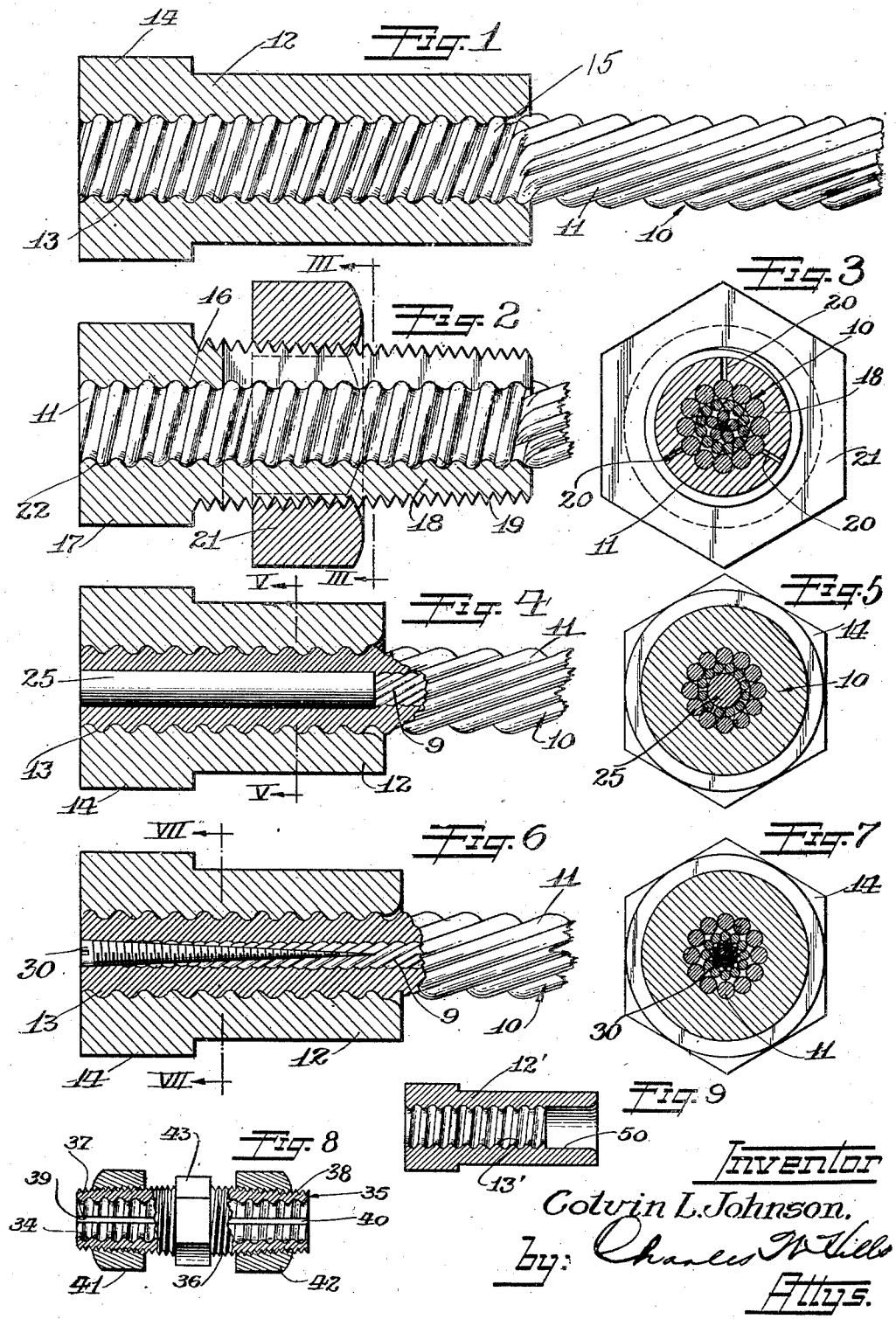

1,732,581

UNITED STATES PATENT OFFICE

COLVIN L. JOHNSON, OF ST. LOUIS, MISSOURI; JESSIE W. JOHNSON EXECUTRIX OF SAID COLVIN L. JOHNSON, DECEASED

CABLE FITTING

Application filed October 31, 1927. Serial No. 230,163.

The present invention relates in general to a cable or rope fitting and a method of applying the same to the end of a cable, and more particularly to a threaded cable end fitting adapted to be screwed onto the end of a steel wire cable or the like.

In the installation of steel cables and the like, it is at present necessary to employ relatively expensive and cumbersome apparatus to apply fittings to ropes or cables. This means that the installer must carry around with him from place to place the special apparatus for applying the cable fitting to the cable. In many instances I have observed that hydraulic mechanism is employed for anchoring the fitting to the end of the cable. Obviously the use of such mechanism adds considerable to the cost of installing the steel cables and is in addition a nuisance to the installer inasmuch as generally it cannot be used for any other purpose.

Moreover, I have found that the present types of cable fittings are unsatisfactory and are not capable of withstanding very great tensile strains. In fact, in applying the present type of fittings to the cable ends the steel wires in the cable ends are quite frequently damaged and thus have a detrimental effect upon the longevity of the cables. In many cases heat is used to apply the cable fittings to the cable ends so as to cause a flow of metal about the strands of wire at the end of the cable. This method is unsatisfactory for the reason that the heat tends to render the ends of the steel wires brittle, thus making them subject to cracking when the cables are under strain.

I propose to provide a cable fitting which may be applied to the end of a steel wire cable with facility and without the necessity of any special apparatus.

I also contemplate the provision of a fitting adapted to be applied to the cable end by the means of conventional tools, such, for example, as a bench vise and a suitable wrench.

An object of my invention is the provision of a highly simple and inexpensive cable fitting adapted to be applied to the end of a steel wire cable with facility and in a minimum of time.

Another object of my invention resides in the provision of a cable fitting adapted to be screwed upon the end of the steel wire cable in such a manner that the resulting pressure results in the strands of wire at the end of the cable being formed into a thread corresponding with that of the fitting.

Still another object of the invention has to do with the provision of a fitting adapted to be forced upon the end of a steel wire cable in such a manner that threads are formed on the end of the cable without cutting the steel wires or strands of the cable.

A further object of my invention is to provide a cable fitting adapted to be applied to the end of a steel wire cable in such a manner that the grip of the fitting on the cable will approximate the tensile strength of the cable itself.

Other objects and advantages of my invention will more fully appear from the following detailed description taken in connection with the accompanying drawing, which illustrates several embodiments thereof, and in which Figure 1 is a fragmentary sectional view, partly in elevation, showing my novel fitting applied to the end of a steel wire cable;

Figure 2 is a fragmentary sectional view, partly in elevation, of a modified form of the fitting;

Figure 3 is a vertical sectional view taken on substantially the line III—III of Figure 2 looking in the direction indicated by the arrows;

Figure 4 is a fragmentary sectional view of another modification of my invention;

Figure 5 is a vertical sectional view taken on the line V—V of Figure 4;

Figure 6 is a fragmentary sectional view of still another modification of the invention;

Figure 7 is a vertical sectional view taken on the line VII—VII of Figure 6 looking in the direction indicated by the arrows;

Figure 8 is a sectional view partly in elevation of a further modification of the invention; and Figure 9 is a sectional view of a modified form of fitting.

On the drawings:

Like reference characters designate similar parts throughout the several views.

The reference character 10 designates generally a steel wire cable which may include the conventional core of hemp (not shown) and a spiral winding of steel wires 11. Mounted upon one end of the cable 10 shown in Figure 1 is a cable or rope fitting 12 embodying the features of my invention. This fitting comprises a tubular member or sleeve provided with an internal thread 13. It is applied to the cable end by screwing it thereon.

In applying the fitting 12 to the cable 10, the cable is gripped in a suitable bench vise adjacent the end which is to receive the fitting, and the fitting is screwed onto the cable by means of a suitable pipe or monkey-wrench.

It will be noted that the fitting 12 includes a hexagonal portion 14 designed to be gripped by the wrench. Now as the fitting 12 is screwed upon the end of the cable 10 it forms a spiral thread 15 in the outer surface of the spiral winding of steel wire 11. This formation of the thread 15 is due to the pressure exerted by the fitting 12 upon the end of the cable. Of course it is to be understood that the end of the cable 10 is slightly compressed as the fitting 12 is applied thereto. Then to it is to be noted that the thread 15 does not result in the cutting of the wires composing the winding 11. I purposely avoid cutting the wires by making the bottom of the grooves of thread 13 of fitting 12 round in cross-section, as shown in Figure 1. This means that as the fitting 12 is screwed upon the end of the cable 10 it causes the portions of the steel wire winding 11 to be forced into the grooves comprising thread 13 without cutting the strands of steel wire.

Now I have found from experience that the gripping action of the fitting 12 upon the cable end 10 is such that it approximates the total tensile strength of the cable itself. Hence in practice, should an excessive force be applied to cable 10, the cable is more likely to break before it could work loose of the fitting 12.

From the foregoing it will be evident that due to the simplicity of the fitting 12 it can be manufactured very economically in large quantities and moreover, it is adapted to be applied to the cable end with facility in a minimum of time and with the conventional tools usually available where such cables are to be installed.

In Figures 2 and 3 I have illustrated a modification of my invention wherein the fitting 16 is applied to the end of the cable 10 in much the same manner as the fitting 12 was applied to the cable 10 shown in Figure 1. The fitting 16, however, includes not only a hexagonal nut portion 17, but also includes a split portion 18 having its outer periphery provided with a conventional thread 19. The split portion 18 is divided into three parts by three slots, 20 (Fig. 3). Now, after the fitting has been applied to the cable, a hexagonal nut 21 is screwed upon the thread 19 on split portion 18 thus causing the three parts comprising portion 18 to be forced inwardly into firm engagement with the outer winding of steel wire 11 on the cable 10.

In other words, the nut 21 serves to augment the biting action of thread 22 of fitting 16 upon the cable 10. This construction may be used where the cable is to be subjected to relatively great strains while in use.

In Figures 4 and 5 I have illustrated a third modification of my invention in which the fitting 12 is identical in construction to the fitting 12 shown in Figure 1 and is applied to the cable 10 in exactly the same way as the fitting was applied to the cable in Figure 1. The same reference characters are used in these two Figures, 4 and 5, as well as in Figures 6 and 7, as were used in connection with the form of the invention shown in Figure 1.

In the form of the invention shown in Figures 4 and 5 a part of the hemp core 9 is removed from the cable prior to the application of the fitting. This may be done by unwinding the wires comprising winding 11 of cable 10 and by then cutting off a portion of the core, or by drilling out the core. Now, before or after the fitting 12 has been applied to the cable a steel pin 25 is inserted in the cable end to take the place of the hemp core removed therefrom. This pin is forced into the cable end and serves to wedge the steel wire winding 11 into tighter engagement with thread 13 of the fitting.

In Figures 6 and 7 I have illustrated another modification of my invention similar to that shown in Figures 4 and 5, but differing therefrom in that it is not necessary to remove any part of the hemp core. After the fitting 12 has been applied to the cable 10 in a manner such as that described in connection with the form of the invention shown in Figure 1, a long conical screw or pin 30 is threaded or driven into the core 9 of the cable 10. This screw or pin 30 also serves as a wedging means for forcing the steel wire winding 11 of the cable into firmer engagement with the thread 13 of the fitting 12.

Now it will be evident that either of the wedging devices shown in Figures 4 and 6 may be applied to either of the cable ends shown in Figures 1 and 2 depending upon the construction desired and upon the conditions to which the cable is to be exposed.

In Figure 8 I have illustrated a further modification of the invention wherein the tubular member or sleeve 35 is provided with an internal thread 34, an outer thread 36 and with two tapered ends 37 and 38. Each tapered end is slotted as indicated at 39 and 40. Threaded upon each of these ends 37—38, is a nut 41—42. An intermediate or central portion of the sleeve 35 is formed integral with it, and hexagonal nut portion 43 which serves as a means whereby the fitting may be gripped in a wrench or the like. This fitting is applied to the end or other part of the cable on which a fitting is required by merely inserting the cable into the fitting. It will be evident that by thereafter tightening the two nuts 41 and 42 the slotted ends 37 and 38 will be forced into engagement with the periphery of the cable. Obviously the tighter the nuts are threaded upon the tapered ends 37 and 38 the greater will be the pressure exerted by the fitting upon the cable. The internal thread 34 of this fitting will form a thread in the cable in the same manner as the fitting shown in Figure 1.

The fitting 12' shown in Figure 9 is identical to the fitting shown in Figure 1 with the exception that one of its ends is countersunk as indicated at 50 so as to facilitate the threading of the cable into the threaded opening 13' of the fitting. Since this fitting is in every other respect identical to that shown in Figure 1 it is thought that no further description need be given of it.

Also, I wish to call attention to the fact that in certain instances, if it is so desired, the cable may be tinned prior to the application of fitting thereto. Of course, it will be evident that the tin will augment the holding of the wires together. Thereafter the tinned surface of the cable may be threaded with a common thread die such as is well known in the art. Subsequent to this threading action a suitable fitting may be screwed onto the threaded surface of the cable.

It is of course to be understood that although I have illustrated and described in detail the preferred embodiments of my invention, the invention is not to be thus limited but only in so far as defined by the scope and spirit of the appended claims.

I claim as my invention:

1. The process of applying a cable fitting to an end of a cable which consists in securing the fitting onto the end of the cable and contemporaneously forming a thread in the outer periphery of the cable conforming to the thread of the fitting without cutting the cable by said fitting.

2. The process of applying a threaded fitting to the end of a steel wire cable which consists in screwing the fitting onto the end of the cable and contemporaneously forming a thread in the outer periphery of the steel wires comprising the cable without cutting the steel wires.

3. The process of applying a threaded fitting to the end of a cable which consists in forcing the fitting onto the end of the cable contemporaneously forming a thread in the outer periphery of the cable without cutting the cable by said fitting, and thereafter causing the formed cable end to be more tightly engaged by the fitting.

4. The process of applying a threaded fitting to a cable end which consists in forcing the fitting upon the end of the cable contemporaneously forming a thread in the outer periphery of the cable by the fitting without cutting the cable, and thereafter wedging the cable into tighter engagement with the thread of the fitting.

5. The process of applying a threaded fitting to a cable end which consists in forcing the fitting upon the end of the cable contemporaneously forming a thread in the outer periphery of the cable by the fitting without cutting the cable, and before or after inserting wedge into the core of the cable to force the periphery of the cable into firmer engagement with the thread of the fitting.

6. The process of applying a cable fitting to the end of a cable which consists in forcing the fitting upon the end of the cable contemporaneously forming a thread in the outer periphery of the cable by said fitting conforming with the thread of the fitting, wedging the fitting into tighter engagement with the threaded portion of the cable end and wedging the periphery of the cable outwardly into firmer engagement with the thread of the fitting.

7. As an article of manufacture, a cable end fitting, comprising a sleeve adapted to be gripped by a wrench for rotation and having a thread formed on its inner periphery including a plurality of rounded grooves, said thread being adapted to form the end of a cable by the rotation of said sleeve without cutting the strands of the cable.

8. In combination, a cable, a cable end fitting comprising a sleeve mounted upon the end of the cable, and means including a thread formed in the inner periphery of the sleeve for forming the end of the cable without cutting the strands thereof upon the rotation of the sleeve on said cable, said formed cable end having a thread on its periphery formed by the sleeve and corresponding with the thread in said sleeve.

9. In combination, a cable, a cable end fitting comprising a sleeve mounted upon the end of the cable, means including a thread formed in the inner periphery of the sleeve for forming the end of the cable without cutting the strands thereof upon the rotation of the sleeve on said cable, said formed cable end having a thread on its periphery formed by the sleeve and corresponding with the thread in said sleeve, and means for wedging the sleeve into tight engagement with the cable end after the sleeve has been threaded on the cable.

10. In combination, a cable, a cable end fitting comprising a sleeve mounted upon the end of the cable, means including a thread formed in the inner periphery of the sleeve for forming the end of the cable without cutting the strands thereof upon the rotation of the sleeve on said cable, said formed cable end having a thread on its periphery formed by the sleeve and corresponding with the thread in said sleeve, and means for wedging the sleeve into tight engagement with the cable end after the sleeve has been threaded on the cable, said latter means comprising a nut threaded upon a slotted portion of the sleeve for forcing said portion into tighter engagement with the cable.

11. In combination, a cable, a cable end fitting comprising a sleeve mounted upon the end of the cable, means including a thread formed in the inner periphery of the sleeve for forming the end of the cable without cutting the strands thereof, said formed cable end having a thread on its periphery formed by the sleeve and corresponding with the thread in said sleeve, and means for forcing the cable outwardly into tighter engagement with the sleeve comprising a wedge element forced into the center of the cable end and disposed in substantial alignment with the core of the cable.

12. In combination, a cable, a cable end fitting comprising a sleeve mounted upon the end of the cable, means including a thread formed in the inner periphery of the sleeve for forming the end of the cable without cutting the strands thereof, said formed cable end having a thread on its periphery formed by the sleeve and corresponding with the thread in said sleeve, means for wedging a portion of said sleeve into tighter engagement with the cable end after the sleeve has been applied thereto, and means for wedging the cable outwardly into tighter engagement with the fitting.

In testimony whereof I have hereunto subscribed my name at St. Louis, Missouri.

COLVIN L. JOHNSON.